(12) United States Patent
Chun et al.

(10) Patent No.: US 9,706,536 B2
(45) Date of Patent: Jul. 11, 2017

(54) METHOD FOR TRANSMITTING/RECEIVING CONTROL INFORMATION AND APPARATUS FOR TRANSMITTING/RECEIVING

(75) Inventors: Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 82 days.

(21) Appl. No.: 14/123,948

(22) PCT Filed: Jan. 31, 2012

(86) PCT No.: PCT/KR2012/000713
§ 371 (c)(1),
(2), (4) Date: Dec. 11, 2013

(87) PCT Pub. No.: WO2012/169716
PCT Pub. Date: Dec. 13, 2012

(65) Prior Publication Data
US 2014/0153515 A1    Jun. 5, 2014

Related U.S. Application Data

(60) Provisional application No. 61/494,392, filed on Jun. 7, 2011.

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0053* (2013.01); *H04L 5/0094* (2013.01)

(58) Field of Classification Search
CPC .............. H04L 27/2613; H04J 11/0073; H04J 11/0076; H04J 11/0079; H04J 2211/001
See application file for complete search history.

(56) References Cited

U.S. PATENT DOCUMENTS

2011/0075624 A1 * 3/2011 Papasakellariou et al. .. 370/329
2011/0170496 A1 * 7/2011 Fong et al. .................... 370/329
(Continued)

OTHER PUBLICATIONS

ZTE, "Aspects on DL control signaling enhancements", 3GPP TSG RAN WG1 #65, R1-111521, May 9-13, 2011.
(Continued)

*Primary Examiner* — Alvin Zhu
(74) *Attorney, Agent, or Firm* — Dentons US LLP

(57) ABSTRACT

The present invention relates to a method for a terminal receiving control information in a distributed multi-node system, and provides a method for receiving the control information comprising the steps of: receiving from a node information relating to a resource allocation method with regard to an enhanced-physical downlink control channel (E-PDCCH); and receiving from the node the control information through the E-PDCCH, based on the information relating to the resource allocation method which is received.

14 Claims, 7 Drawing Sheets

(56) References Cited

U.S. PATENT DOCUMENTS

2011/0237283 A1* 9/2011 Shan ................ H04L 5/0091
 455/509
2012/0281646 A1* 11/2012 Liao et al. ................ 370/329

OTHER PUBLICATIONS

Panasonic, "Cnsiderations on PDCCH Enhancements for Release 11", 3GPP TSG RAH WG1 E65, R1-111589, May 9-13, 2011.
Research in Motion et al., "PDCCH Enhancement Considerations", 3GPP TSG RAN WG1 #65, R1-111661, May 9-13, 2011.
Media Tek INc., "Discussion on PDCCH Enhancement for DL MU-MIMO and CoMP", 3GPP TSG RAN WG1 #65, R1-111531, May 9-13, 2011.
International Search Report for PCT/KR2012/000713, dated Jul. 25, 2012.
Written Opinion of the ISA from PCT/KR2012/000713, dated Jul. 25, 2012.

\* cited by examiner

METHOD FOR TRANSMITTING/RECEIVING CONTROL INFORMATION AND APPARATUS FOR TRANSMITTING/RECEIVING

This Application is a 35 U.S.C. §371 National Stage Entry of International Application No. PCT/KR2012/000713, filed Jan. 31, 2012 and claims the benefit of U.S. Provisional Application No. 61/494,392, filed Jun. 7, 2011, all of which are incorporated by reference in their entirety herein.

TECHNICAL FIELD

The present invention relates to a wireless communication, and more particularly, to a method of transmitting/receiving control information in a distributed multi-node system and an apparatus therefor.

BACKGROUND ART

As such various devices as an M2M device to which an M2M (machine-to-machine) communication is applied, a smart phone and a tablet computer requiring a high data demand, and the like have emerged and propagated, data demand for a network in a wireless communication is rapidly increasing in a current wireless communication environment. In order for a communication technology to satisfy the increasing data demand, the communication technology is developing to a carrier aggregation technology, a cognitive radio technology, and the like to efficiently use more frequency bands and to a multi-antenna technology, a multi-base station cooperation technology, and the like to increase data capacity in a limited frequency band. Moreover, the wireless communication environment is evolving in a manner that density of a node accessible in the vicinity of a user increases. This sort of a high-density node system may have higher system performance in a manner of performing cooperation between nodes. This kind of scheme performs a cooperative communication in a manner of using a plurality of nodes operating as a base station (e.g., a Base Station, an Advance BS, a Node B, an eNode B), an access point (AP), an antenna, an antenna group, a radio remote header (RRH), or a radio remote unit (RRU), respectively.

Moreover, if an individual node operates as a part of an antenna group of a single base station in a manner that one controller manages transmission and reception of all nodes, this system may be considered as a DMNS (distributed multi node system). In this case, the individual nodes may receive a separate Node ID or may operate as a part of an antenna in a cell without the separate Node ID.

Meanwhile, if nodes have a cell ID different from each other in the DMNS, this system may be considered as a multi cell (e.g., macro cell/femto cell/pico cell) system. If multi cells formed by each of a plurality of nodes are configured in a manner of being overlaid according to coverage, this is called a multi-tier network.

Meanwhile, base stations of various forms can be used as a node irrespective of its name. In particular, a BS (base station), an NB (Node B), an eNB (eNode B), a pico-cell eNB (PeNB), a home eNB (HeNB), an RRH, an RRU, a relay, a repeater, and the like can be a node. At least one antenna is installed in a node. An antenna may mean a physical antenna, an antenna port, a virtual antenna, or an antenna group. And, a node may be called a point as well.

Although a node indicates an antenna group apart from a different antenna group more than a prescribed space in general, the node may indicate a random antenna group irrespective of a space. For instance, it is able to define that a base station controls a node configured by a H-pol antenna and a node configured by a V-pol antenna.

DISCLOSURE OF THE INVENTION

Technical Task

The present invention provides a method of transmitting/receiving control information capable of efficiently supporting a user equipment in a DMNS and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving control information, by a user equipment in a distributed multi-node system, comprises receiving information on a resource assignment scheme for an E-PDCCH (enhanced-physical downlink control channel) from a node and receiving the control information from the node via the E-PDCCH based on the received information on the resource assignment scheme.

To further achieve these and other advantages and in accordance with the purpose of the present invention, according to a different embodiment, a device receiving control information in a distributed multi-node system includes a transmitter, a receiver, and a processor configured to receive information on a resource assignment scheme for an E-PDCCH (enhanced-physical downlink control channel) from a node in a manner of controlling the receiver, the processor configured to receive control information from the node via the E-PDCCH based on the received information on the resource assignment scheme.

To further achieve these and other advantages and in accordance with the purpose of the present invention, according to a different embodiment, a method of transmitting control information, which is transmitted by a node in a distributed multi-node system includes the steps of transmitting information on a resource assignment scheme for an E-PDCCH (enhanced-physical downlink control channel) and transmitting control information via the E-PDCCH according to the resource assignment scheme.

To further achieve these and other advantages and in accordance with the purpose of the present invention, according to a further different embodiment, a device transmitting control information in a distributed multi-node system, includes a transmitter, a receiver, and a processor configured to transmit information on a resource assignment scheme for an E-PDCCH (enhanced-physical downlink control channel) in a manner of controlling the transmitter, the processor configured to transmit control information via the E-PDCCH according to the resource assignment scheme.

The resource assignment scheme includes a localized resource assignment scheme and a distributed resource assignment scheme.

The information on the resource assignment scheme is received by an RRC (radio resource control) signaling.

The information on the resource assignment scheme is received on a PDCCH (physical downlink control channel) in a manner of being included in downlink control information.

The PDCCH in which the information on the resource assignment scheme is received corresponds to an E-PCFICH (enhanced-physical control format indicator channel).

The information on the resource assignment scheme is received as a CSI-RS (channel state information-reference signal) and the resource assignment scheme is determined according to which CIS-RS configuration is received.

The E-PDCCH includes information on a resource assignment scheme for a corresponding PDSCH (physical downlink shared channel).

The E-PDCCH is received in a data region of a subframe.

Advantageous Effects

According to embodiment of the present invention, efficiency of a resource can be optimized in a manner of enabling nodes to support a resource assignment method of each of the nodes. And, a user equipment can promptly and efficiently transmit/receive control information.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
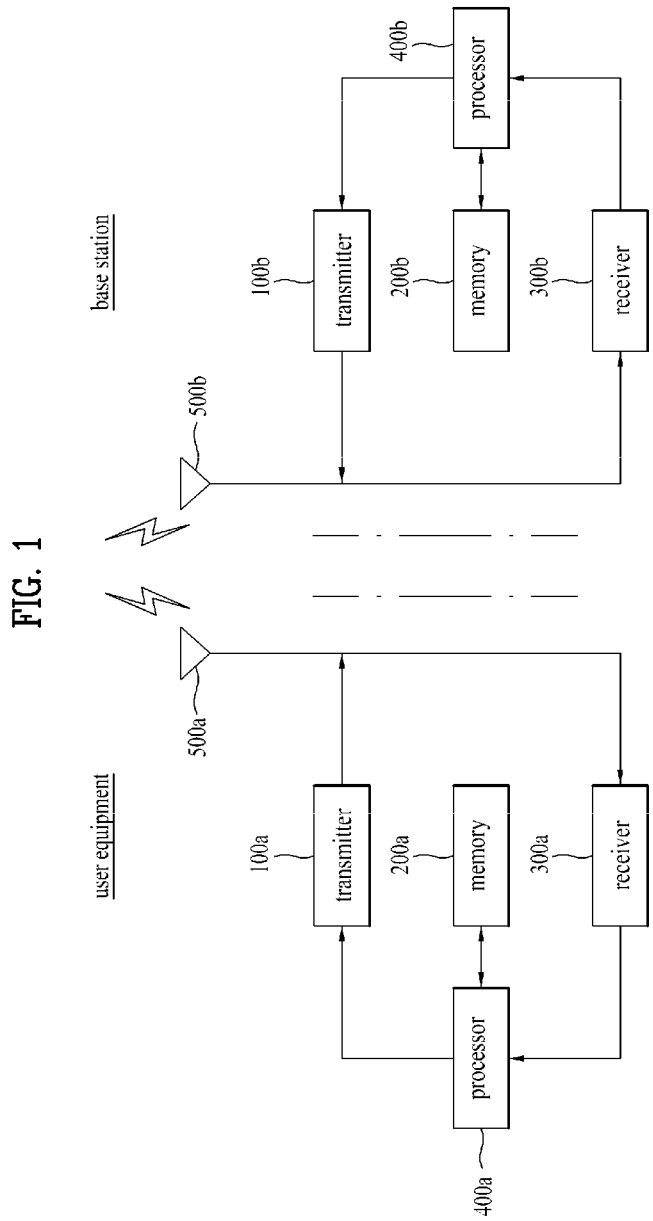
FIG. 1 is a block diagram for a configuration of a base station and a user equipment to which an embodiment of the present invention is applicable.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

In the following detailed description of the invention includes details to help the full understanding of the present invention. Yet, it is apparent to those skilled in the art that the present invention can be implemented without these details. And, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the present invention may be explained based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal may be stationary or may have mobility. And, the terminal may be a common name of a device for transceiving various kinds of data and control informations by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control informations by communicating with a terminal and other base stations. The base station may be named such a terminology as eNB (evolved-NodeB), BTS (Base Transceiver System), ABS (Advanced Base station), BS (base station), PS (processing server), RRH (Radio Remote Header), AP (Access Point) and the like.

In the present invention, if a specific signal is assigned to one of a frame, a subframe, a slot, a carrier and a subcarrier, it may mean that the specific signal is transmitted in an interval or timing of the frame, the subframe, or the slot on the corresponding carrier or subcarrier.

In the present invention, a rank or a transmission rank may mean the number of layers multiplexed with or allocated to one OFDM symbol or one resource element (RE).

In the present invention, PDCCH (physical downlink control channel)/PCFICH (physical control format indicator channel)/PHICH (physical hybrid automatic repeat request indicator channel)/PDSCH (physical downlink shared channel) is used to carry DCI (downlink control information)/CFI (control format indicator)/downlink ACK/NACK (acknowledgement/Negative ACK)/downlink data, respectively.

And, PUCCH (physical uplink control channel)/PUSCH (physical uplink shared channel)/PRACH (physical random access channel) is used to carry UCI (uplink control information)/uplink data/random access signal, respectively.

In particular, a resource element (RE) allocated to or belongs to PDCCH/PCFICH/PHICH/PDSCH/PUCCH/PUSCH/PRACH is called a PDCCH/PCFICH/PHICH/PDSCH/PUCCH/PUSCH/PRACH RE or a PDCCH/PCFICH/PHICH/PDSCH/PUCCH/PUSCH/PRACH resource, respectively.

Hence, an expression that a user equipment transmits PUCCH/PUSCH/PRACH may be used as a same meaning that the user equipment transmits uplink control information/uplink data/random access signal on the PUCCH/PUSCH/PRACH. And, an expression that a base station transmits PDCCH/PCFICH/PHICH/PDSCH may be used as a same meaning that the base station transmits downlink control information/downlink data and the like on the PDCCH/PCFICH/PHICH/PDSCH.

FIG. 1 is a block diagram for a configuration of a base station and a user equipment to which an embodiment of the present invention is applicable. In particular, a user equipment works as a transmitting device in UL or works as a receiving device in DL. On the contrary, a base station works as a receiving device in UL or works as a transmitting device in DL.

Referring to FIG. 1, a user equipment/base station (UE/BS) may include an antenna 500a/500b capable of receiving information, data, signals, messages and the like, a transmitter 100a/100b transmitting information, data, signals, messages, and the like by controlling the antenna, a receiver 300a/300b receiving information, data, signals, messages, and the like by controlling the antenna and a memory 200a/200b storing various kinds of informations within a wireless communication system temporarily or permanently. Moreover, the user equipment/base station includes a processor 400a/400b configured to control various such components as the transmitter, the receiver, the memory, and the like.

The transmitter 100a, the receiver 300a, the memory 200a and the processor 400a in the user equipment may be implemented as an independent component by a separate chip, respectively. Alternatively, at least two of the transmitter 100a, the receiver 300a, the memory 200a and the processor 400a in the user equipment may be implemented with a single chip. On the other hand, the transmitter 100b, the receiver 300b, the memory 200b and the processor 400b in the base station may be implemented as an independent component by a separate chip, respectively. Alternatively, at least two of the transmitter 100b, the receiver 300b, the memory 200b and the processor 400b in the base station may be implemented with a single chip. Alternatively, the transmitter and the receiver may be implemented as a single transceiver in the user equipment or the base station in a manner of being integrated into the single transceiver.

The antenna 500a/500b may play a role of transmitting a signal generated from the transmitter 100a/100b to the external. And, the antenna 500a/500b may play a role of receiving a signal from the external and then delivering the received signal to the receiver 300a/300b. Moreover, the antenna 500a/500b may be called an antenna port, an antenna group, a virtual antenna, and the like. In this case, the antenna port may correspond to a single logical/physical antenna or may be configured by a combination of a plurality of logical/physical antennas. In case of a transceiver supporting a MIMO (multi-input multi-output) function of transmitting and receiving data and the like using a plurality of antennas, at least two antennas may be connected to the transceiver.

In general, the processor 400a/400b may control overall operations of various components or modules in a user equipment or a base station. In particular, the processor 400a/400b may be able to perform various control functions to perform the present invention, a MAC (medium access control) frame variable control function according to service characteristics and propagation environment, a power saving mode function to control an idle mode operation, a handover function, an authentication and encryption function and the like. And, the processor 400a/400b may be named one of a controller, a microcontroller, a microprocessor, a microcomputer and the like. Moreover, the processor 400a/400b may be implemented by hardware, firmware, software or a combination thereof.

In case of implementing the present invention using hardware, the processor 400a/400b may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor 400a/400b in a manner of being loaded in the processor 400a/400b or being saved in the memory 200a/200b.

The transmitter 100a/100b may perform prescribed coding and modulation on a signal and/or data, which is scheduled by the processor 400a/400b or a scheduler connected to the processor 400a/400b and will be then transmitted externally, and may be then able to deliver the coded and modulated signal and/or data to the antenna 500a/500b. The transmitter 100a/100b and the receiver 300a/300b of the user equipment and the base station may be differently configured depending on a process for processing a transmission signal and a reception signal.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The user equipment and the base station may perform various embodiments described in the following description with the aforementioned structure.

Figure 2:
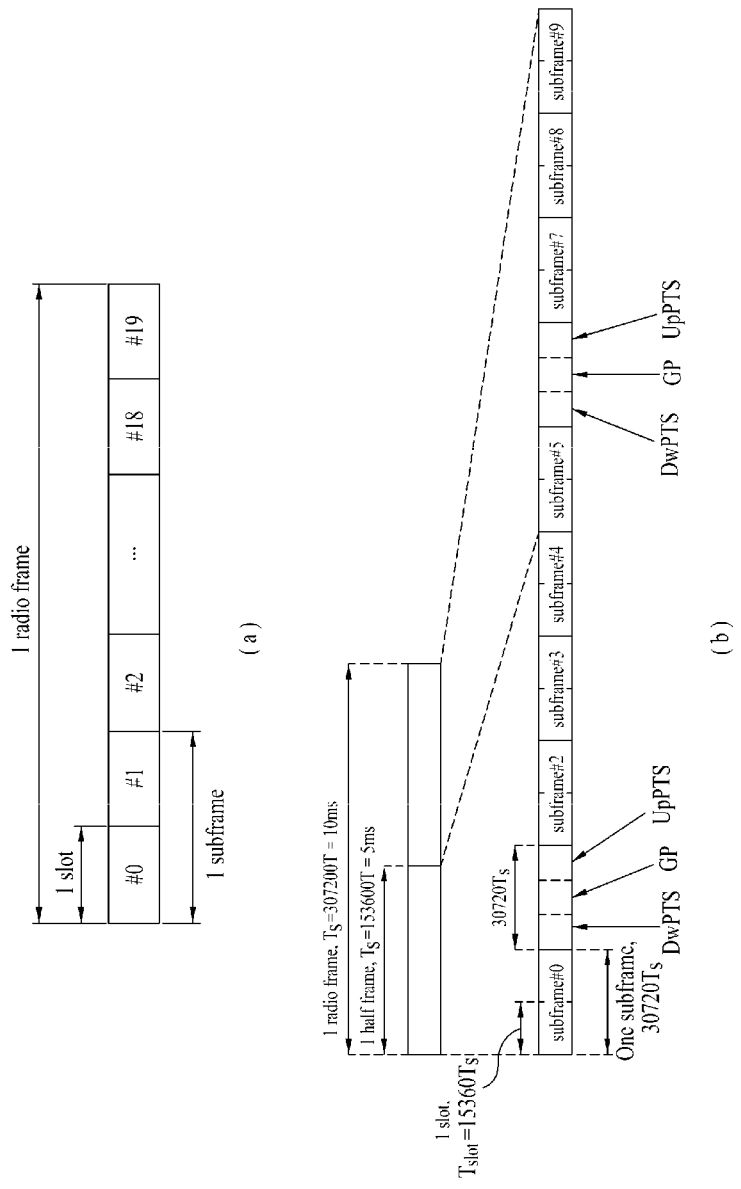
FIG. 2 is a diagram for a configuration of a radio frame to which an embodiment of present invention is applicable.

FIG. 2 is a diagram for a configuration of a radio frame to which the an embodiment of the present invention is applicable. In an OFDM wireless communication system, UL/DL (uplink/downlink) data transmission is performed by a unit of subframe. And, one subframe is defined as a prescribed time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes.

Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
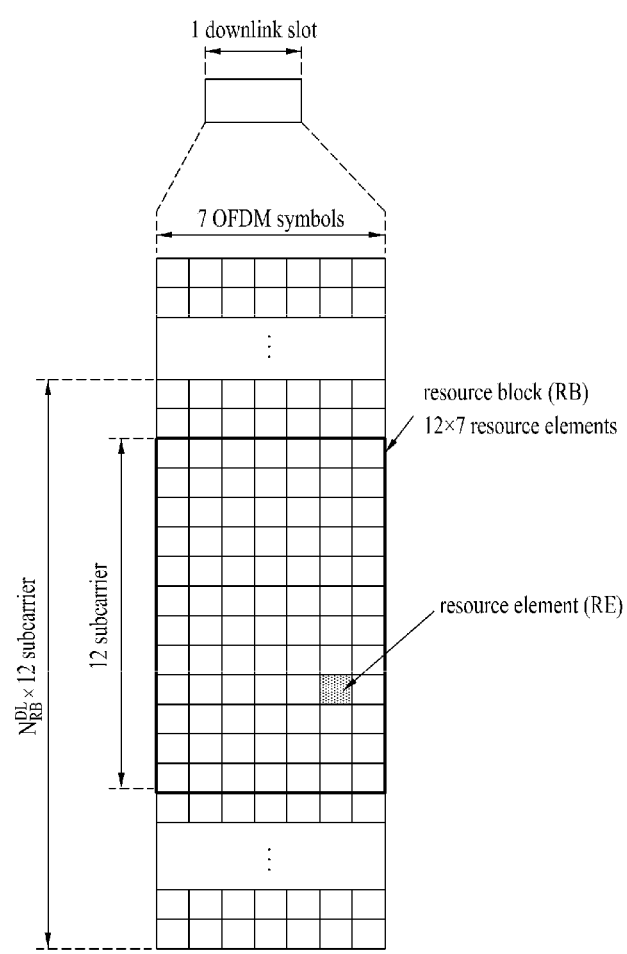
FIG. 3 is a diagram for an example of a resource grid for a downlink slot.

FIG. 3 is a diagram of a resource grid for a downlink slot. Specifically, FIG. 3 depicts a case that an OFDM symbol is configured by a normal CP. Referring to FIG. 3, a downlink (DL) slot may include a plurality of OFDM symbols in time domain and includes a plurality of resource blocks (RBs). In particular, one DL slot includes 7 OFDM symbols and one resource block (RB) includes 12 subcarriers, by which the present invention may be non-limited. Each element on a resource grid is called a resource element (hereinafter abbreviated RE). For instance, a value of a resource element (k, 1) corresponds to a resource element positioned at a $k^{th}$ subcarrier and an $1^{th}$ OFDM symbol. In case of a normal CP, one resource block includes 12×7 resource elements (in case of an extended CP, one resource block includes 12×6 resource elements). Since a space of each subcarrier corresponds to 15 kHz, one resource block includes about 180 kHz in frequency domain. $N^{DL}_{RB}$ indicates the number of resource blocks included in a downlink slot. A value of the $N^{DL}_{RB}$ can be determined according to a DL transmission bandwidth, which is configured by a scheduling of a base station.

Figure 4:
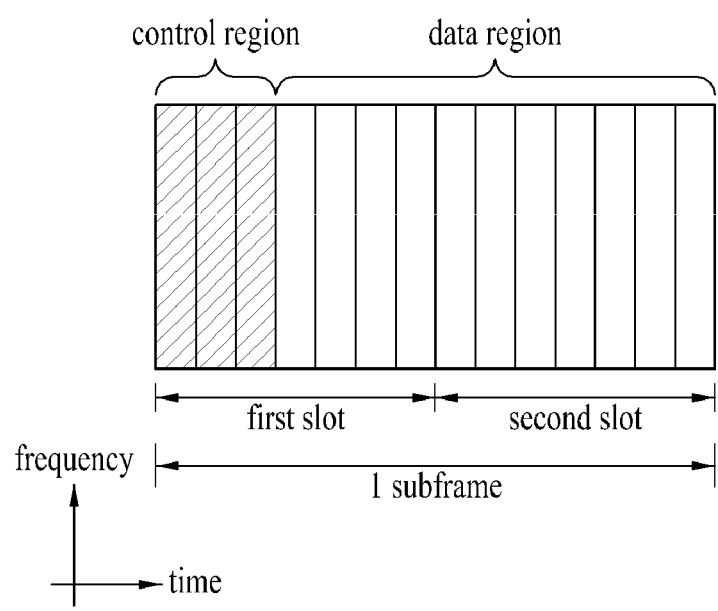
FIG. 4 is a diagram for an example of a downlink subframe.

FIG. 4 is a diagram for an example of a downlink subframe. Referring to FIG. 4, maximum 3 OFDM symbols situated at a fore part of a first slot of one subframe correspond to a control region allocated to a control channel. The rest of OFDM symbols correspond to a data region allocated to PDSCH (physical downlink shared channel). Examples of a downlink channel used for 3GPP LTE include PCFICH (physical control format indicator channel), PDCCH (physical downlink control channel), PHICH (physical hybrid ARQ indicator channel), and the like.

The PCFICH is transmitted in a first OFDM symbol of a subframe and carries information on the number of OFDM symbols used for a transmission of a control channel within the subframe. The PHICH transmits a HARQ ACK (acknowledgement)/NACK (Negative Acknowledgement) signal in response to an UL transmission. Control information carried on PDCCH may be called downlink control information (hereinafter abbreviated DCI). The DCI includes UL/DL scheduling information or information on a UL transmit power control command for a random user group. PDCCH can carry a transmission format, resource allocation information of DL-SCH (downlink shared channel), a transmission format and resource allocation information of UL-SCH (uplink shared channel), paging information on a PCH (paging channel), system information on a DL-SCH, resource allocation information of an upper layer control message such as a random access response transmitted on PDSCH, a transmit (Tx) power control command set for an individual user equipment within a random user equipment (UE) group, a transmit (Tx) power control command, information on activation indication of VoIP (voice over IP), and the like. A plurality of PDCCHs can be transmitted in a control region and a user equipment is able to monitor a plurality of the PDCCHs. PDCCH is transmitted by one or a set of a plurality of contiguous control channel elements (CCEs).

A CCE is a logical assignment unit used to provide PDCCH with a coding rate in accordance with a state of a radio channel. The CCE corresponds to a plurality of REGs (resource element groups). A format of PDCCH and the number of available bits of PDCCH are determined according to correlation between the number of CCEs and the coding rate provided by the CCE. A base station determines a PDCCH format in accordance with DCI transmitted to a user equipment and attaches a CRC (cyclic redundancy check) to control information.

A CRC is masked with a unique identifier (e.g., RNTI (radio network temporary identifier)) in accordance with an owner or usage of PDCCH. If PDCCH is provided for a specific user equipment, the CRC can be masked with a unique identifier of the corresponding user equipment, i.e., C-RNTI (i.e., Cell-RNTI). If PDCCH is provided for a paging message, the CRC can be masked with a paging identifier (e.g., P-RNTI (Paging-RNTI)). If PDCCH is provided for system information, and more particularly, for a system information block (SIB), the CRC can be masked with a system information identifier and system information RNTI (SI-RNTI). If PDCCH is provided for a random access response, the CRC can be masked with RA-RNTI (random access-RNTI).

A user equipment can receive data information via PDSCH, which is indicated by control information transmitted on PDCCH. A control region consists of a CCE set corresponding to a plurality of CCEs (control channel elements). A CCE corresponds to a plurality of resource element groups. A plurality of PDCCHs can be transmitted in the control region for a plurality of user equipments.

PDCCH is transmitted by aggregating at least one CCE. In this case, the number of CCEs used to transmit PDCCH is called an aggregation level of the CCE. For instance, the aggregation level may correspond to one of 1, 2, 4, and 8. The aggregation level is the number of CCEs used to transmit PDCCH and corresponds to a unit of a CCE to search for the PDCCH. The aggregation level of a CCE may vary depending on a user equipment.

One of the reasons that the aggregation level is different from each other according to a user equipment is because an MCS (modulation and coding scheme) level is different from each other. The MCS level means a code rate and a modulation order used for a data coding. For instance, if the modulation order corresponds to 2, BPSK (binary phase shift keying) is used. If the modulation order corresponds to 4, QPSK (quadrature phase shift keying) is used. If the modulation order corresponds to 6, 16 QAM (quadrature amplitude modulation) can be used. Meanwhile, when the modulation order is fixed and the code rate is differentiated only, for instance, the modulation order is fixed to the QPSK and the code rate (useful bit/total bit) is used as ⅔, ⅓, ⅙, or 1/12, if PDCCH carrying the control information using the code rate of ⅔ corresponds to the aggregation level for the CCE of 1, PDCCH carrying the control information using the code rate of ⅓ corresponds to the aggregation level for the CCE of 2. PDCCH carrying the control information using the code rate of ⅙ corresponds to the aggregation level for the CCE of 4 and PDCCH carrying the control information using the code rate of 1/12 corresponds to the aggregation level for the CCE of 8. The increase of the code rate indicates that repetition of an identical data is reduced in a CCE. If the repetition of the identical data increases in the CCE, transmission reliability of a message, a signal, or the like may increase. On the contrary, if repetition of an identical data increases, it may become a waste in terms of a radio resource.

Meanwhile, PDCCH configuration is independently performed according to each PDCCH. Since a base station does not provide information on where PDCCH is located in a control region within a subframe to a user equipment, the user equipment should perform a blind decoding on all CCEs in the control region for each subframe with an available aggregation level to receive the PDCCH transmitted to the user equipment.

When a signal is transmitted in a wireless communication system, since a data is transmitted on a radio channel, distortion of the signal may occur in the middle of transmitting the signal. In order for a receiving side to receive the distorted signal properly, channel information should be obtained. The distortion of the signal should be corrected as much as the channel information from the received signal. In order to obtain the channel information, a signal known to both a transmitting side and the receiving side is transmitted. When the signal known to both the transmitting side and the receiving side is received on the channel, the channel information can be obtained from the extent of distortion of the signal. The signal known to both the transmitting side and the receiving side is called a pilot signal or a reference signal. In case of transmitting and receiving a signal using a multi-antenna port, the signal can be properly received when channel information between each of transmitting antenna ports and each of receiving antenna ports is obtained. Hence, a separate reference signal is necessary for each of the transmitting antenna ports.

A reference signal can be classified into a common reference signal (CRS) shared by all user equipments in a cell and a dedicated reference signal (DRS) for a specific user equipment. By using these sorts of reference signals, information required for channel estimation and demodulation can be provided.

The receiving side can perform a feedback on such channel information related to a channel quality as a CQI (channel quality indicator), a PMI (precoding matrix index), and an RI (rank indicator) for the transmitting side in a manner of estimating a channel state from a CRS. The CRS can be called a Cell-specific Reference Signal. When data on PDSCH is necessary to be demodulated, the DRS can be transmitted via a corresponding resource element. The DRS can be called a UE-specific reference signal or a DeModulation Reference Signal (DMRS).

The CRS is a reference signal capable of being commonly received by all user equipments in a cell and is distributed across all frequency bands. The CRS can be defined in various forms according to an antenna configuration of the transmitting side. When the transmitting side performs a single antenna transmission, a CRS for a single antenna port is arranged. When the transmitting side performs a transmission of two antenna ports, a CRS for two antenna ports is arranged in a manner of using a time division multiplexing (TDM) scheme and/or a frequency division multiplexing (FDM) scheme. In particular, the CRS for the two antenna ports can be distinguished from each other in a manner of being arranged to a time resource and/or a frequency resource different from each other. And, when the transmitting side performs a transmission of four antenna ports, a CRS for four antenna ports is arranged in a manner of using the TDM scheme and/or the FDM scheme.

Meanwhile, in LTE-A Release 10 (hereinafter abbreviated Rel-10) system, data can be transmitted/received using maximum 8 antenna ports. Hence, if a reference signal pattern for the maximum 8 antenna ports is added to all bands in each subframe similar to a case of the CRS in a legacy LTE system, a significant overhead may occurs. As a result, besides the legacy CRS, a CSI-RS (channel state information reference signal) is proposed to measure a channel for a Rel-10 user equipment. The CSI-RS is transmitted to obtain information on a channel state only. Unlike the legacy CRS, it is not necessary to transmit the CSI-RS in each subframe. And, the CSI-RS supports a heterogeneous network (HetNet) and has maximum 32 types of different configurations to reduce inter-cell interference (ICI) in a multi-cell environment. The configuration for the CSI-RS varies depending on the number of antenna ports within a cell and the CSI-RS is configured as different as possible between neighboring cells. And, the CSI-RS is classified according to a type of a Cyclic Prefix (CP). According to a frame structure (FS), the CSI-RS can be divided into the CSI-RS supporting both a FS 1 and a FS 2 and the CSI-RS supporting the FS 2 only. Unlike the CRS, the CSI-RS supports up to maximum 8 antenna ports (p=15, p=15, 16, p=15, 16, 17, 18, and p=15, 16, 17, 18, 19, 20, 21, 22) and is defined for $\Delta f=15$ kHz only.

In the following description, a method of informing a resource assignment scheme (resource allocation scheme) in a LTE system, which is one example of a wireless communication system, is briefly explained. Basically, a resource assignment (resource allocation) is related to a method of allocating a resource block (RB) to PDSCH, which is a data region in a subframe. The resource assignment scheme can be mainly divided into a localized resource assignment scheme and a distributed resource assignment scheme.

When an RB is sequentially indexed in frequency domain, it is called a PRB (physical resource block). And, a method of directly mapping the PRB to data (or VRB (virtual resource block)) is called a localized resource assignment scheme. This is called a 'VRB localized type' as well.

On the contrary, a method of mapping the PRB to data (or VRB) in a manner of distributing the PRB with a specific rule is called a distributed resource assignment scheme. This is called a 'VRB of distributed type' as well. This scheme is to map the PRBs to the data (or the VRB) in a manner of separating the PRBs each other in frequency domain. This scheme may be useful as a means of gaining frequency diversity.

The aforementioned resource assignment scheme is in downlink control information (DCI) carried by PDCCH and the resource assignment scheme informs of whether the localized resource assignment scheme or the distributed resource assignment scheme is applied for a resource of a corresponding PDSCH. For instance, the aforementioned resource assignment scheme informs of whether the resource of PDSCH is configured by the 'VRBs of localized type' or the 'VRBs of distributed type' using a 'localized/distributed VRB assignment flag' included in a DCI format 1A, 1B, 1C, and 1D.

In the following description, the aforementioned distributed multi-node system (DMNS) is explained in more detail. Unlike a centralized antenna system (CAS) where antennas of a base station are centralized in a center of a cell, the DMNS is a system of managing nodes distributed to various positions in a cell, by a single base station. The DMNS is distinguished from a femto/pico cell in that a plurality of nodes forms a single cell. The DMNS in an early stage is used for repetition to cover a radio shadow area in a manner of additionally installing nodes or antenna nodes. In a broad sense, the DMNS can be considered as a sort of MIMO (multiple input multiple output) system in that the antennas of a base station are able to support one or more users in a manner of transmitting or receiving many data at the same time. The MIMO system is considered as an essential requisite for satisfying a demand of a next generation communication due to its high spectral efficiency.

In terms of the MIMO system, the DMNS has merits compared to the CAS in that power efficiency obtained from a reduced distance between a user and an antenna, high channel capacity due to low correlation and interference between base station antennas, communication performance of a relatively uniform quality irrespective of a position of a user in a cell, and the like.

Figure 5:
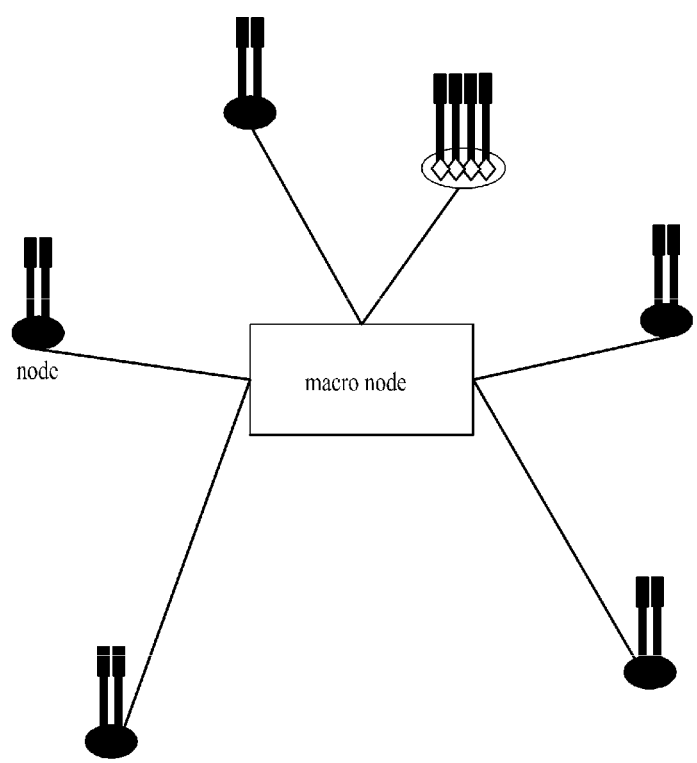
FIG. 5 is a diagram for an example of a distributed multi node system applied to the present invention.

FIG. 5 is a diagram for an example of a distributed multi node system applied to an embodiment of the present invention. Referring to FIG. 5, the DMNS includes a plurality of nodes. A plurality of the nodes may include a macro node. The macro node may operate as a main node. Each of the nodes is connected with the macro node in wired or wireless and may include at least one antenna. In general, a distance between nearest antennas is less than several meters for the antennas belonging to a node. The antennas have a characteristic of belonging to a regionally same position. The node plays a role of such as an access point accessible by a user equipment.

Meanwhile, in case of the DMNS where a plurality of nodes including a macro node exist in an identical cell and all of a plurality of the nodes use an identical cell ID, different types of resource assignment scheme can be used for each of the nodes. In particular, the localized resource assignment scheme can be applied to a part of the nodes and the distributed resource assignment scheme can be applied to different nodes. Yet, for a user equipment (e.g., a UE before LTE Rel-11) not supporting the DMNS system where a plurality nodes exist in a cell, one resource assignment scheme should be supported in a cell.

Hence, each of the nodes should support both the localized resource assignment scheme and the distributed resource assignment scheme for a new user equipment supporting the DMNS and the user equipment and for a user equipment not supporting the DMNS (hereinafter abbreviated a legacy UE). In the following description, the present invention provides a resource assignment scheme applicable to both the new user equipment and the legacy UE.

The legacy UE decodes a downlink control channel (e.g., PDCCH) assigned to the legacy UE without recognizing nodes within a cell and may be then able to proceed a procedure with a resource assignment scheme resulted from decoding. As mentioned in the foregoing description, the resource assignment scheme can be obtained via 'localized/distributed VRB assignment flag' included in downlink control information (DCI) in PDCCH.

And, the new UE decodes a downlink control channel assigned to the new UE and may be then able to proceed a procedure with a resource assignment scheme resulted from decoding. In this case, the downlink control channel capable of being decoded by the new UE can be distinguished from a legacy downlink control channel (e.g., PDCCH). The downlink control channel capable of being decoded by the new UE can be defined as an E-PDCCH (enhanced PDCCH). A format of the E-PDCCH or information transmitted on the E-PDCCH may be identical to that of the PDCCH.

Figure 6:
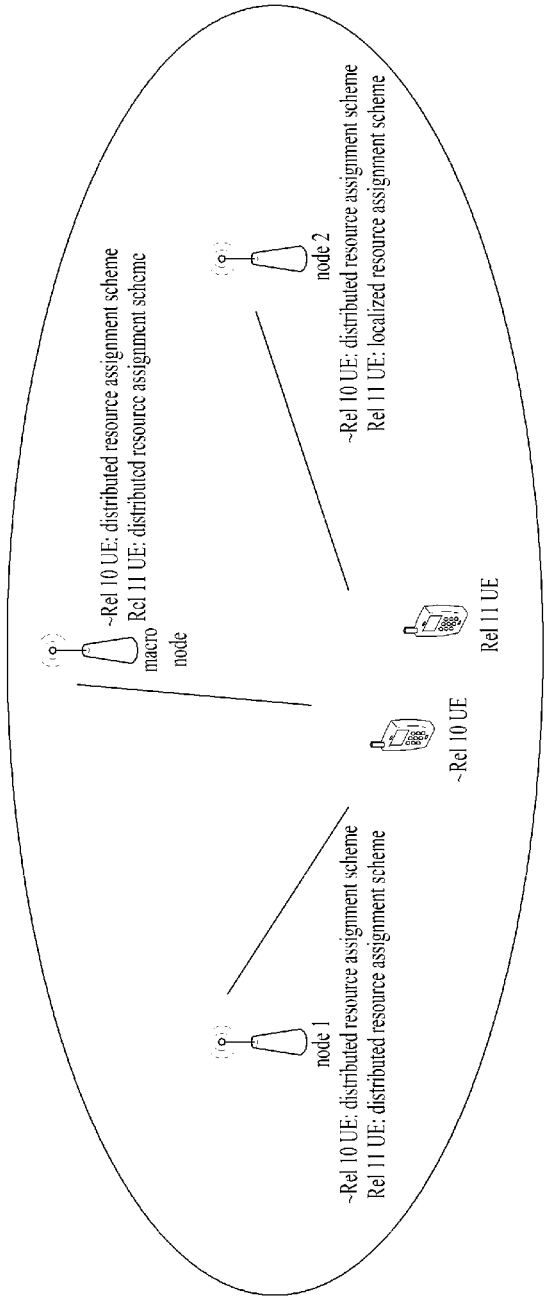
FIG. 6 is a diagram of a DMNS structure to which an embodiment of the present invention is applicable.

FIG. 6 is a diagram of a DMNS structure to which an embodiment of the present invention is applicable. The DMNS can be applied in a LTE Rel-11 system, which is an example of a wireless communication system. Yet, the DMNS may not be applied in a previous system of the LTE Rel-11 system. Referring to FIG. 6, assume that the DMNS includes a user equipment supporting the LTE Rel-11 system and a user equipment (legacy UE) before the LTE Rel-11, supports a plurality of nodes, and defines an E-PDCCH, by which the present invention may be non-limited.

In case of legacy UEs, data can be received in a manner of decoding a corresponding PDSCH with a resource assignment scheme informed by downlink control information (DCI) in PDCCH. And, in case of new UEs, data can be received in a manner of decoding a corresponding PDSCH with a resource assignment scheme informed by an E-PDCCH.

In particular, a Rel-1 UE receiving a service of a node 1 decodes the E-PDCCH transmitted from the node 1 and then knows that the resource assignment scheme of a corresponding PDSCH uses the distributed resource assignment scheme. Based on this, the Rel-11 UE obtains data in a manner of decoding the corresponding PDSCH. A Rel-11 UE receiving a service of a node 2 decodes the E-PDCCH transmitted from the node 2 and then knows that the resource assignment scheme of a corresponding PDSCH uses the localized resource assignment scheme. Based on this, the Rel-11 UE obtains data in a manner of decoding the corresponding PDSCH.

The legacy UEs know that the resource assignment scheme of a corresponding PDSCH uses the distributed resource assignment scheme in a manner of decoding PDCCH of a macro node. Based on this, the legacy UEs can obtain data by decoding the corresponding PDSCH. And the legacy UEs may be able to know the resource assignment scheme of the corresponding PDSCH by decoding PDCCH transmitted from a node located in the vicinity of the legacy UEs. Based on this sort of resource assignment scheme, data can be obtained by decoding the corresponding PDSCH.

Hence, each of the nodes can support two types of resource assignment schemes in an identical band and can appropriately control the two types of resource assignment schemes via a scheduling. In terms of a UE, the UE just obtains a resource assignment scheme of PDSCH assigned to the UE without considering the nodes.

Meanwhile, as mentioned in the foregoing description, a position, a format, and the like of PDCCH in a control region of a subframe are informed by PCFICH or can be checked in a manner of performing a blind decoding on the control region of the subframe. Yet, in case of a newly defined E-PDCCH, a scheme of informing a position and a format of the newly defined E-PDCCH has not been studied yet. In particular, if the E-PDCCH is positioned at a data region (a region to which PDSCH is transmitted) instead of a control region, the E-PDCCH can be decoded when a corresponding resource assignment scheme is known only. In the following description, a method of informing a resource assignment scheme for an E-PDCCH is explained in detail.

In a DMNS, a configuration of a resource assignment scheme in a cell is mainly divided into two types.

First of all, a method of informing a resource assignment scheme is explained in case that the resource assignment scheme for an E-PDCCH in a cell is identical to each other and the resource assignment scheme for PDSCH is different from each other depending on a node.

For instance, for each of the nodes, the resource assignment scheme for the E-PDCCH is identical to the resource assignment scheme for a macro node in a cell. Or, the distributed resource assignment scheme is always applied for a diversity gain.

Since a UE is aware of the resource assignment scheme for the E-PDCCH in advance, information in the E-PDCCH can be obtained by performing a blind decoding on the E-PDCCH in a data region of a subframe. The obtained information may include a resource assignment scheme for a corresponding PDSCH. The UE can obtain data by decoding the corresponding PDSCH in a manner of applying the resource assignment scheme for the PDSCH.

Meanwhile, when the PDSCH is decoded, the UE may omit the decoding on the resource elements used as the corresponding E-PDCCH. In particular, by restricting the decoding on an unnecessary region, it may reduce a needless waste of a resource.

A search space of an E-PDCCH, i.e., a region in which a blind decoding is performed can be known via a common search space (cell-specific area) of the E-PDCCH or an E-PCFICH. The E-PCFICH can be defined as PDCCH including information on the resource assignment scheme for the E-PDCCH.

Subsequently, in case that the resource assignment scheme for the E-PDCCH and the resource assignment scheme for PDSCH are different from each other depending on a node in a cell, a method of informing the resource assignment scheme is explained. To decode E-PDCCH, a UE should know which resource assignment scheme is applied to the E-PDCCH. To decode PDSCH, a UE should be able to decode a corresponding E-PDCCH.

As a first embodiment, a decoding on an E-PDCCH can be performed in a manner of applying all resource assignment schemes. Specifically, the decoding on the E-PDCCH can be performed by carrying out the blind decoding twice, i.e., the distributed resource assignment scheme and the localized resource assignment scheme. In this case, the number of performing the blind decoding increases as many as two times compared to a legacy blind decoding.

As a second embodiment, the resource assignment scheme for the E-PDCCH can be informed by a cell-specific signal or a node-specific signal. In this case, two of the resource assignment schemes can be distinguished from each other using a flag of 1-bit. For instance, the distributed resource assignment scheme can be represented as '0 (or 1)' and the localized resource assignment scheme can be represented as '1 (or 0)'.

First of all, the resource assignment scheme for the E-PDCCH of (all or a part) nodes within a cell can be informed by E-PCFICH. To this end, a format of downlink control information (DCI) informing the resource assignment scheme for the E-PDCCH is additionally defined and the format can be transmitted via a common search space (cell-specific area) of PDCCH. In this case, the additionally defined PDCCH can be called an E-PCFICH. Meanwhile, node-specific information can be additionally included in the E-PCFICH.

Secondly, the resource assignment scheme for the E-PDCCH of (all or a part) nodes within a cell can be informed by signaling of an RRC message. The RRC message may correspond to a cell-specific (common in a cell) RRC message.

Thirdly, it may be able to transmit a node-specific signal in which a specific value for distinguishing nodes and the resource assignment scheme for the E-PDCCH is mapped. For instance, a method of associating a node with a configuration of a CSI-RS may be proposed. In case that a UE does not know about a node and knows about a CSI-RS configuration, the CSI-RS configuration and the resource assignment scheme can be represented by a signal of a bitmap. In particular, the distributed resource assignment scheme and the localized resource assignment scheme are defined as '0 (or 1)' and '1 (or 0)', respectively. If the CSI-RS configuration exists from 0 to 31, the resource assignment scheme according to the CSI-RS configuration can be represented by a total of 32 bits. Or, only a part of the CSI-RS configuration can be represented by a bitmap. In this case, for the part of the CSI-RS configuration represented by bitmap, a UE should recognize such information as a CSI-RS configuration index and the like in advance. Or, the CSI-RS configurations can be classified as two groups (e.g., odd indexes and even indexes) in a manner that one group indicates the distributed resource assignment scheme and another group indicates the localized resource assignment scheme.

A UE can know the resource assignment scheme for the E-PDCCH according to a CSI-RS configuration index assigned to the UE. If a plurality of CSI-RS configurations are assigned to one UE, the resource assignment scheme for the E-PDCCH is determined on the basis of a predetermined one CSI-RS configuration. For instance, the resource assignment scheme for the E-PDCCH is determined on the basis of a CSI-RS configuration of a smallest or a largest index among the assigned CSI-RS configurations. Or, the resource assignment scheme for the E-PDCCH can be determined on the basis of a firstly assigned CSI-RS configuration. In this case, the remaining CSI-RS configurations except the CSI-RS configuration becoming the basis may not be signaled. Or, although the remaining CSI-RS configurations are signaled, a UE can ignore the remaining CSI-RS configurations.

Lastly, node-specific information can be transmitted via an E-PCFICH configured to decode an E-PDCCH. It may be able to obtain information, included in the E-PCFICH, on the resource assignment scheme for the E-PDCCH of each node, in a manner of performing a blind decoding on the E-PCFICH in a common search space (cell-specific area) within a subframe.

As a third embodiment, the resource assignment scheme for the E-PDCCH can be informed by PDCCH or a user-specific signal of an RRC message.

First of all, the resource assignment scheme for the E-PDCCH can be informed using PDCCH. Specifically, similar to the method of informing of the resource assignment scheme for a corresponding PDSCH in downlink control information (DCI) transmitted via a user-specific region of PDCCH, the resource assignment scheme for the E-PDCCH can be informed as the downlink control information transmitted via the user-specific region of PDCCH. After decoding the PDCCH, a UE performs a second step procedure of decoding the E-PDCCH according to a result of decoding. Meanwhile, in order to minimize a resource waste, the downlink control information transmitted on the PDCCH may include essential information to decode the E-PDCCH.

And, the resource assignment scheme for the E-PDCCH can be informed using a signal (user-specific signal) related to a specific user equipment in an RRC (radio resource control) layer.

Figure 7:
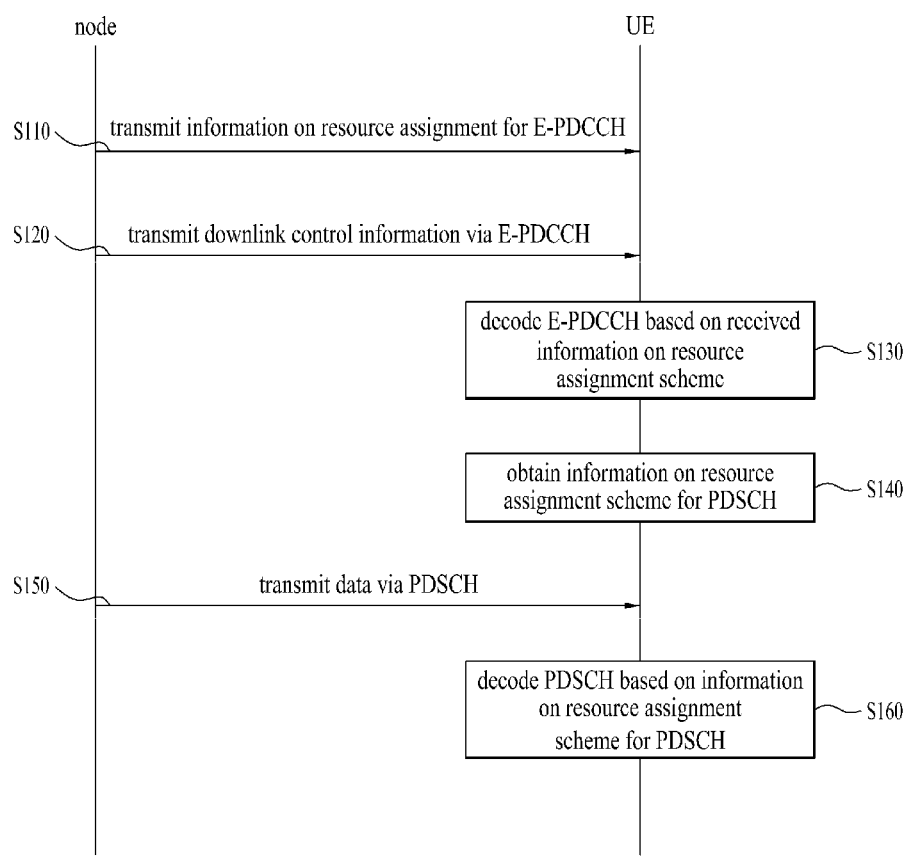
FIG. 7 is a flowchart for a process of transmitting/receiving data according to one embodiment of the present invention.

FIG. 7 is a flowchart for a process of transmitting/receiving data according to one embodiment of the present invention. FIG. 7 is explained under an assumption that a plurality of nodes exist and an environment in which E-PDCCH is defined in a DMNS, by which the present invention may be non-limited. Referring to FIG. 7, a node transmits information on the resource assignment scheme for the E-PDCCH (enhanced-physical downlink control channel) to a user equipment [S110]. The resource assignment scheme may include a localized resource assignment scheme and a distributed resource assignment scheme. The information on the resource assignment scheme can be transmitted by a cell-specific RRC signaling, a node-specific RRC signaling, or a UE-specific RRC signaling. And, the information on the resource assignment scheme can be transmitted via a common search space (cell-specific area) of PDCCH or a user-specific region of PDCCH. This sort of PDCCH can be called an E-PCFICH. And, the information on the resource assignment scheme can be transmitted as a CSI-RS. In particular, the localized resource assignment scheme can be distinguished from the distributed resource assignment scheme according to a corresponding CSI-RS configuration in a manner of mapping the CSI-RS configuration to the resource assignment scheme.

The node transmits downlink control information via the E-PDCCH corresponding to the received resource assignment scheme [S120]. The control information can include information on a resource assignment scheme for PDSCH corresponding to the E-PDCCH. The UE can decode the E-PDCCH in a manner of applying the received resource assignment scheme for the E-PDCCH [S130]. And, the UE can obtain the information on the resource assignment scheme for the PDSCH via the decoded E-PDCCH [S140]. The node transmits data on the PDSCH [S150]. The UE can obtain the data by decoding the PDSCH in a manner of applying the resource assignment scheme for the PDSCH [S160].

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting and receiving control information according to the present invention can be used in such various wireless communication systems as 3GPP LTE/LTE-A, IEEE 802, and the like.

What is claimed is:

1. A method of receiving control information, by a user equipment in a distributed multi-radio remote head (RRH) system, the method comprising:
   receiving information on an enhanced-physical downlink control channel (E-PDCCH) resource assignment scheme from a first RRH among a plurality of RRHs distributed in a cell; and
   receiving, based on the received information on the E-PDCCH resource assignment scheme, control information including information on a physical downlink shared channel (PDSCH) resource assignment scheme from the first RRH via an E-PDCCH,
   wherein the information on the E-PDCCH resource assignment scheme indicates whether the E-PDCCH is allocated based on a localized resource assignment scheme for directly mapping a physical resource block (PRB) to a virtual resource block (VRB) or whether the E-PDCCH is allocated based on a distributed resource assignment scheme for distributing the PRB before mapping the PRB to the VRB, and
   wherein the E-PDCCH resource assignment scheme is the same for the plurality of RRHs distributed in the cell and the PDSCH resource assignment scheme is independently determined for each RRH among the plurality of RRHs distributed in the cell.

2. The method of claim 1, wherein the information on the E-PDCCH resource assignment scheme is received by an radio resource control (RRC) signaling.

3. The method of claim 1, wherein the information on the E-PDCCH resource assignment scheme is included in downlink control information and received on a physical downlink control channel (PDCCH).

4. The method of claim 3, wherein the PDCCH in which the information on the E-PDCCH resource assignment scheme is received corresponds to an enhanced-physical control format indicator channel (E-PCFICH).

5. The method of claim 1, wherein the information on the E-PDCCH resource assignment scheme is received as a channel state information-reference signal (CSI-RS) and wherein the E-PDCCH resource assignment scheme is determined according to which CSI-RS configuration is used for the received CSI-RS among a plurality of CSI-RS configurations.

6. The method of claim 1, wherein the E-PDCCH is received in a data region of a subframe.

7. A device receiving control information in a distributed multi-radio remote header (RRH) system, comprising:
a transmitter;
a receiver; and
a processor that controls the receiver to:
receive information on an enhanced-physical downlink control channel (E-PDCCH) resource assignment scheme from a RRH among a plurality of RRHs distributed in a cell, and
receive control information including information on a physical downlink shared (PDSCH) resource assignment scheme from the RRH via an E-PDCCH based on the received information on the E-PDCCH resource assignment scheme,
wherein the information on the E-PDCCH resource assignment scheme indicates whether the E-PDCCH is allocated based on a localized resource assignment scheme for directly mapping a physical resource block (PRB) to a virtual resource block (VRB) or a distributed resource assignment scheme for distributing the PRB before mapping the PRB to the VRB, and
wherein the E-PDCCH resource assignment scheme is the same for the plurality of RRHs distributed in the cell and the PDSCH resource assignment scheme is independently determined for each RRH among the plurality of RRHs distributed in the cell.

8. The device of claim 7, wherein the information on the E-PDCCH resource assignment scheme is received by an radio resource control (RRC) signaling.

9. The device of claim 7, wherein the information on the E-PDCCH resource assignment scheme is included in downlink control information and received on a physical downlink control channel (PDCCH).

10. The device of claim 9, wherein the PDCCH in which the information on the E-PDCCH resource assignment scheme is received corresponds to an enhanced-physical control format indicator channel (E-PCFICH).

11. The device of claim 7, wherein the information on the E-PDCCH resource assignment scheme is received as a channel state information-reference signal (CSI-RS) and wherein the E-PDCCH resource assignment scheme is determined according to which CSI-RS configuration is used for the received CSI-RS among a plurality of CSI-RS configurations.

12. The device of claim 7, wherein the E-PDCCH is received in a data region of a subframe.

13. A method of transmitting control information, by a first radio remote header (RRH) in a distributed multi-RRH system, the method comprising:
transmitting by the first RRH, which is a RRH among a plurality of RRHs distributed in a cell, information on an enhanced-physical downlink control channel (E-PDCCH) resource assignment scheme; and
transmitting, according to the E-PDCCH resource assignment scheme, control information including information on a physical downlink shared channel (PDSCH) resource assignment scheme via an E-PDCCH,
wherein the information on the E-PDCCH resource assignment scheme indicates whether the E-PDCCH is allocated based on a localized resource assignment scheme for directly mapping a physical resource block (PRB) to a virtual resource block (VRB) or whether the E-PDCCH is allocated based on a distributed resource assignment scheme for distributing the PRB before mapping the PRB to the VRB, and
wherein the E-PDCCH resource assignment scheme is the same for the plurality of RRHs distributed in the cell and the PDSCH resource assignment scheme is independently determined for each RRH among the plurality of RRHs distributed in the cell.

14. The method of claim 13, wherein the information on the E-PDCCH resource assignment scheme is transmitted as a channel state information-reference signal (CSI-RS) and wherein the E-PDCCH resource assignment scheme is determined according to which CSI-RS configuration is used for the transmitted CSI-RS among a plurality of CSI-RS configurations.

* * * * *